T. & J. M. SCANTLIN.
Evaporator.
No. 48,982.
Patented July 25, 1865.
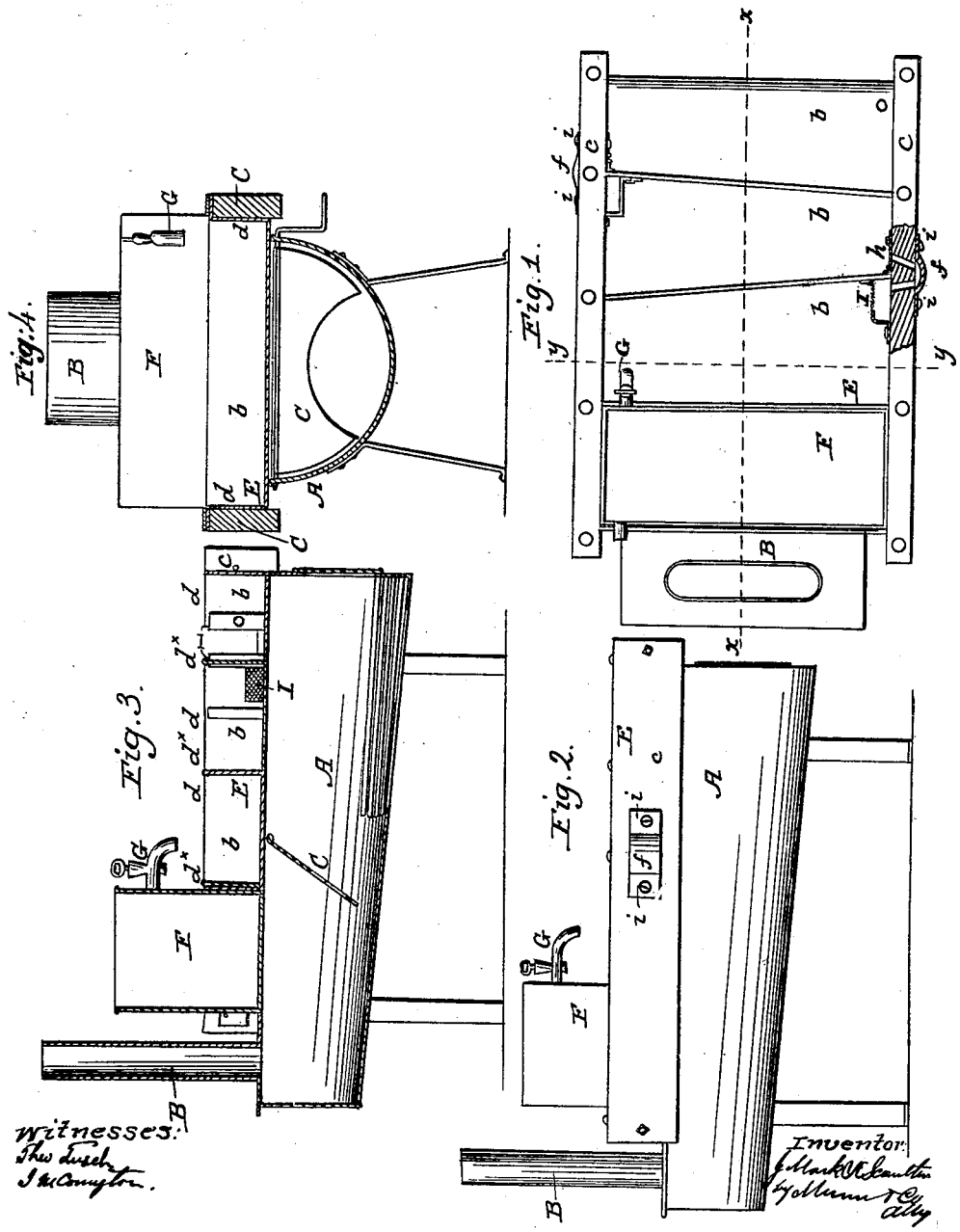

UNITED STATES PATENT OFFICE.

THOS. SCANTLIN AND JAS. M. SCANTLIN, OF EVANSVILLE, INDIANA.

IMPROVED EVAPORATOR.

Specification forming part of Letters Patent No. 48,982, dated July 25, 1865.

*To all whom it may concern:*

Be it known that we, THOMAS SCANTLIN and JAMES MARK SCANTLIN, of Evansville, in the county of Vanderburg and State of Indiana, have invented a new and Improved Evaporating-Pan; and we do hereby declare that the following is a full, clear, and exact description thereof, which will enable those skilled in the art to make and use the same, reference being had to the accompanying drawings, forming part of this specification.

This invention relates to a new and improved evaporating-pan for evaporating sorghum and other saccharine juices. The invention consists in a novel construction of the furnace and pan, as hereinafter fully shown and described, whereby it is believed that several advantages are obtained over other devices for a similar purpose.

In the accompanying drawings, Figure 1, Sheet No. 1, is a plan or top view of our invention; Fig. 2, a side view of the same; Fig. 3, Sheet No. 2, a side sectional view of the same, taken in the line $x\,x$, Fig. 1; Fig. 4, a transverse vertical section of the same, taken in the line $y\,y$, Fig. 1.

Similar letters of reference indicate corresponding parts.

We construct the body of the furnace A of semicircular form in its transverse section and of slightly-taper form longitudinally. (See Figs. 2, 3, and 4.) This furnace may be of metal supported at a suitable height by legs $a$, and provided with a flue, B, at its rear end, and with a damper, C, the latter being at the rear of the grate D. (See Fig. 3.)

The pan E is formed in sections—that is to say, composed of a series of pans, $b$, which are of sheet metal and secured between wooden sides $c\,c$, which, when the pan is placed on or over the furnace A, are beyond the sides of the latter, as shown in Fig. 4. The pans $b$ have their bottoms and front and rear sides constructed of one piece of metal, the ends $d$ being of separate pieces riveted and brazed or soldered in the ends of $b$ and lapping over and secured by bolts to the wooden sides $c\,c$. The front and rear sides are arranged so that the front side of one pan will fit or hook over the top of the rear side of the adjoining one, as shown at $d^x$ in Fig. 3. By constructing the pans $b$ in this manner they are rendered very durable, as there are no seams or joints over the fire to melt, and in case one pan should become injured it may be readily repaired or replaced by a new one, the others being retained, whereas in the ordinary pans a defect or injury at any part causes the whole pan to be rendered useless.

Communication is made between the several pans $b$ by means of passages $e\,e'$ in the wooden sides $c\,c$, said passages being covered by a cap, $f$, at the outer sides of $c\,c$, as shown clearly in Fig. 1. The exit-passage $e$ of each pan has a screen, $g$, in front of it to serve as a strainer, while the induction-opening of each pan is provided with a gate, $h$. By this arrangement the juice will be strained as it passes from one pan $b$ into another. The passages $e\,e'$ and caps $f$ may be of metal cast in one piece and fitted in the wooden sides $c\,c$, and secured by bolts $i$.

The screens $g$ are fitted in grooves or between cleats $j$, secured to the inner surfaces of the pans, to admit of the screens being readily removed from and fitted in the pans.

F represents a juice-receptacle placed at the rear of the pan, and provided with a faucet, G, through which the juice is admitted into the rear pan $b$.

In consequence of having the furnace constructed in the form specified, the heat is concentrated under the pan, and there will be comparatively little loss of heat from radiation.

All the parts, it will be seen, may be very readily constructed, and when repairs are necessary they may be made without any difficulty whatever.

Having thus described our invention, we claim as new and desire to secure by Letters Patent—

1. The constructing of the furnace A of semi-cylindrical taper form, substantially as and for the purpose set forth.
2. Having the evaporating-pan E constructed in sections or formed of a series of pans, $b$, constructed, connected together, and secured between the wooden sides $c\,c$ in the manner substantially as and for the purpose specified.
3. The passages $e\,e'$ made or placed in the wooden sides $c\,c$, and arranged with screens $g$ and gates $h$, substantially as set forth.

THOMAS SCANTLIN.
JAMES MARK SCANTLIN.

Witnesses:
F. M. SELLMAN,
C. C. CLARK.